June 28, 1938.  K. ROSENBERG  2,121,987
ELECTRICAL ARRANGEMENT FOR DISPLAYING PICTURES AND COMMUNICATIONS
Filed May 14, 1935  2 Sheets-Sheet 1

INVENTOR
K. ROSENBERG
BY
ATTORNEY

June 28, 1938.  K. ROSENBERG  2,121,987
ELECTRICAL ARRANGEMENT FOR DISPLAYING PICTURES AND COMMUNICATIONS
Filed May 14, 1935  2 Sheets-Sheet 2

INVENTOR
K. ROSENBERG
BY
ATTORNEY

Patented June 28, 1938

2,121,987

UNITED STATES PATENT OFFICE 2,121,987

ELECTRICAL ARRANGEMENT FOR DISPLAYING PICTURES AND COMMUNICATIONS

Kurt Rosenberg, Berlin, Germany, assignor, by mesne assignments, to American Epok Inc., New York, N. Y., a corporation of New York Application May 14, 1935, Serial No. 21,332
In Germany June 6, 1934

10 Claims. (Cl. 177—346)

This invention relates to improvements in an electrical arrangement for displaying pictures and communications by means of a lamp screen. Primarily, the invention relates to improvements of arrangements as described in my co-pending application Serial No. 692,884, filed October 9th, 1933, which issued into Patent 2,069,851.

It is an object of the invention to increase the efficiency of such arrangement.

It is another object of the invention to reduce the number of discharge vessels necessary for controlling the incandescent lamps of the screen.

These and other objects of the invention will more fully be derived from the following description with reference to the drawings. In these drawings diagrams of two electrical arrangements are shown by way of example, realizing the principles of my invention.

Figure 1:
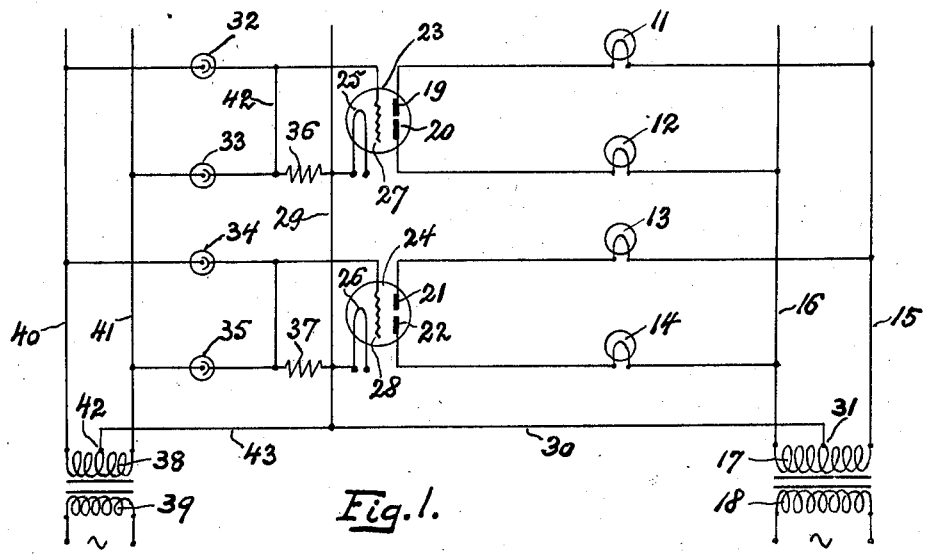
Figure 2:
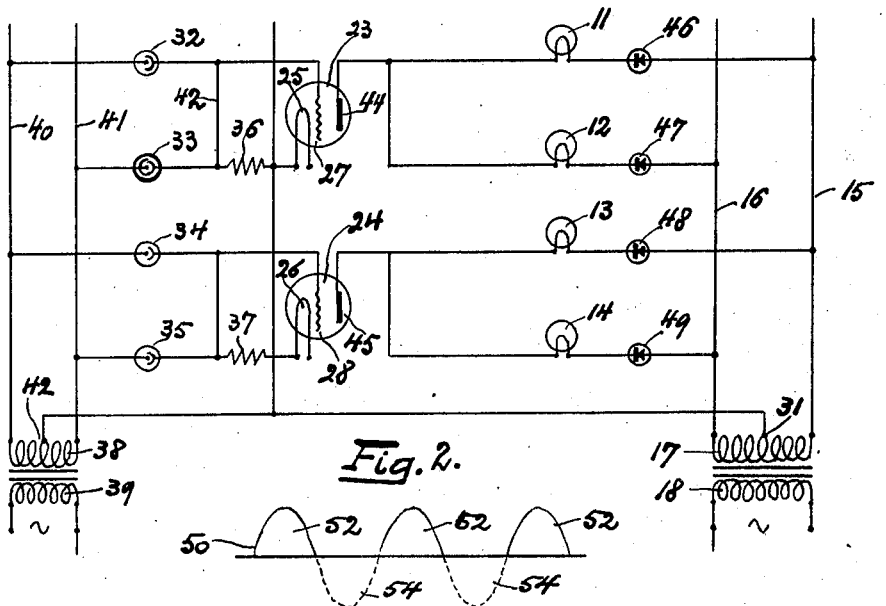
Figure 3:
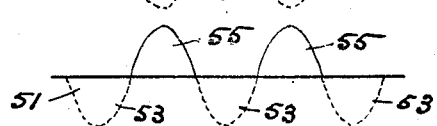
Figure 5:
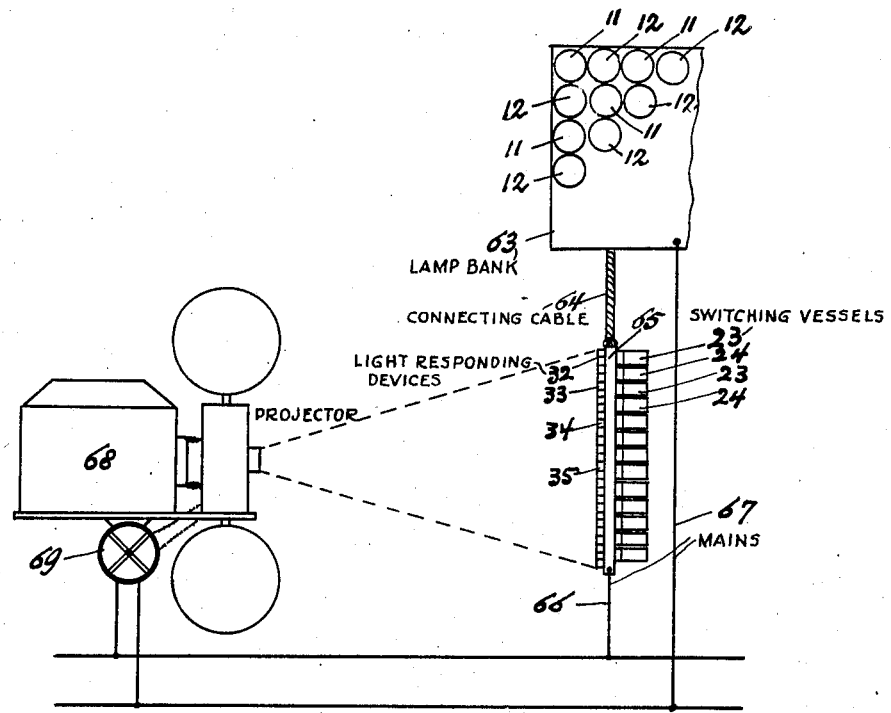
Figure 4:
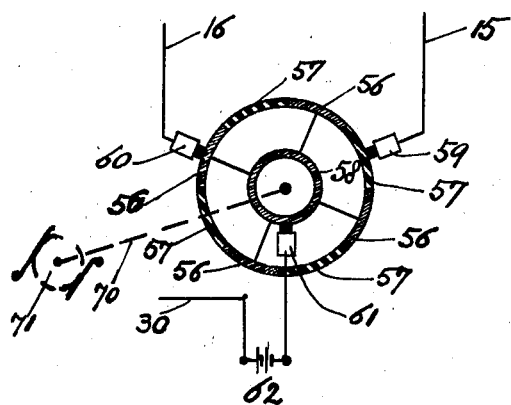

In the drawings, Fig. 1 shows a wiring arrangement according to one feature, and Fig. 2 shows such an arrangement according to another feature of the invention, while Fig. 3 is showing the way in which the alternating current is used in this invention, Fig. 4 shows a switch-arrangement for supplying intermittent direct current to the lamps and photo cells and Fig. 5 shows diagrammatically the entire arrangement of the lamp screen, including the controlling photo cells and the projector illuminating the photo cells. Idential reference numbers have the same significance.

In Fig. 1 groups of incandescent lamps 11, 12, 13, 14, each group consisting of at least one lamp, are connected in pairs, such as pair 11, 12 and 13, 14. Obviously, the number of such pairs may be increased in any desired way in order to fill the desired portion of the lamp field or to form the entire lamp bank, and in order to simplify the drawings, only two such pairs are shown. The lamp groups 11, 13 are connected at one terminal with the main 15, while the groups 12, 14 are connected at one terminal with the main 16. The mains 15, 16 are connected with any suitable source of alternating current having an electrical center point, such as the secondary 17 of a transformer, the primary 18 of which may be connected with any suitable source of alternating current. The other terminals of the groups of each pair are connected with an anode electrode 19, 20 and 21, 22, respectively, of a discharge vessel 23, 24 having a preferably heated cathode 25, 26 and a grid 27, 28, respectively. These discharge vessels 23, 24 are of the well known type, permitting the start of the flow of current between the cathode and anode only in case a certain potential is applied to the grid, such current if started not being affected in its flow by any further change of the potential of the grid and being only interrupted by switching off the voltage between the anode and cathode. Regularly, the grids of such discharge vessels are kept at a sufficient negative potential relative to the cathode in order to prevent the start of flow of current after it has once been interrupted, and this negative potential has to be reduced, sometimes also to be converted into a positive one, in order to permit a new start of flow of current under appropriate anode voltage conditions. These devices may be called hereafter "switching vessels". The cathodes 25, 26 of these switching vessels are connected with the line 29, which is in turn connected with the line 30, leading to the electrical center point 31 of the secondary 17.

The grids 27, 28 are connected with the cathodes 25, 26 over a high resistance 36, 37, respectively, which permit a discharge of the grids. The grids are furthermore connected with a suitable source of alternating voltage, such as the secondary 38 of a transformer. The primary 39 of the transformer may be fed in any suitable way by an alternating current of the same frequency as and being in phase with the one feeding the primary 18. These two sources may be identical, while the voltages derived therefrom and applied to the lamp groups and grids, respectively, will ordinarily be different. The grid 27 is connected with the line 40 by the light responsive device (photo cell) 32, and with the line 41 by the light responsive device (photo cell) 33. In the same way, grid 28 is connected with line 40 by the photo cell 34, and with the line 41 by photo cell 35. The line 40 is connected to one terminal, and line 41 to the other terminal of the secondary 38, the center point 42 of which is connected by the conductor 43 with the conductor 29 and thereby with the cathodes of the switching vessels, and, furthermore, by the conductor 30 with the center point 31 of the source of alternating current feeding the lamp groups.

It may be supposed that, in operation, the sources of alternating current are connected with the lamp groups and photo cells, respectively, and that the photo cell 32 will be illuminated to such a degree that it permits a flow of current from the line 40 to the grid 27 sufficient to give the grid 27 a potential permitting the start of flow of current through the switching vessel. Such current will start from one of the anodes 19, 20, to which a positive half-wave of current is supplied at this time. It may be supposed, that at this time the main 15 carries such positive half-wave of alternating current supplied by the secondary 17, and consequently a current will start to flow from main 15 through lamp group 11 to anode 19, cathode 25, lines 29, 30, back to the center point 31 of the secondary 17. In such way, the lamp group 11 is lit up by the controlling photo cell 32. The lamp group 11 will be illuminated as long as the positive half-wave lasts. Afterwards, if the negative half-wave of the alternating current starts and the current changes its direction in the main 15 no current can pass the lamp group 11 any more, this being prevented by the uni-directional valve action of the switching vessel. Through the main 16, however, at the same time, the current of the negative half-wave flows in a direction suitable to pass the lamp group 12 and the gap between anode 20 and cathode 26, through lines 29, 30 back to the center point 31. Such current can, however, only start to flow if the grid 27 has again a suitable potential relative to the cathode 25. The current in the lines 40, 41 being in phase with the current in the mains 15, 16 and therefore reversed too, photo cell 32 having a uni-directional valve action cannot be passed by this reversed current. But photo cell 33, if illuminated, may now be passed by the negative half-wave flowing through the line 40, photo cell 33, line 42 to the grid 27, applying thereto a voltage suitable to start the flow of current from the anode 20 to the cathode 25. Consequently, the lamp group 12 is illuminated.

It is assumed in the foregoing description of operation that the resistances 36, 37 are of such value in comparison to the resistance of an illuminated photo-cell connected in series therewith that at the point of branching off the grids 27, 28, respectively, a positive potential is built up relative to the cathodes 25, 26, respectively, sufficient to bring the respective grid to the desired higher potential relative to the cathode. Then, as explained in my co-pending application Ser. No. 692,884, the picture projected upon the screen of photo-cells will be reproduced in the lamp screen in a positive way. Transparent points of the film will then be reproduced by lighted lamps, while dark spots in the film will be reproduced by dark lamps in the lamp screen. If, however, the resistances 36, 37 etc. are dimensioned otherwise, so that upon illuminating a photo-cell not a sufficient positive charge, but a negative charge is brought upon the grid, a kind of negative reprduction will occur, and transparent parts of the stencil or film will be reproduced by dark lamps, and their dark spots will be reproduced by illuminated lamps.

In the same way as two pairs of lamp groups are controlled by co-ordinated switching vessels and photo cells in a combination according to that of Fig. 1, any number of pairs of lamp groups may be controlled, arranging the lamp groups of each pair between the middle line 29, on one hand, and the mains 15 and 16, respectively, on the other hand, interposing a switching vessel having two anodes, one cathode and a controlling grid between each pair of lamp groups and the middle line, while the co-ordinated two photo cells are to be arranged between the controlling grid and the lines 40, 41, respectively, providing a suitable leakage path between the grid and cathode. Also in this exemplification of my invention it is assumed that the lamp groups 11, 12, 13 and 14 do not comprise lamps having a rectifying effect, as glow-discharge lamps have, but that ordinary incandescent lamps are used.

As to be gathered from the foregoing description of Fig. 1, two anodes 19, 20 are to be provided in the switching vessel 23 opposite a single grid and single cathode in order to establish a uni-directional valve effect for both lamp groups relative to the alternating current supply.

In Fig. 2, a single anode 44 is disposed in the vessel 23 and a single anode 45 in the vessel 28. The above mentioned valve effect is obtained by arranging uni-directional valves 46, 47, 48, 49 in every branch containing one of the lamp groups 11, 12, 13, 14. Supposing a positive half-wave in the main 15, it can proceed only through the valves 46, 48 to the lamp groups 11, 13 and the switching vessels 23, 24; supposing the positive half-wave is flowing in the main 16, it can proceed only through the valves 47, 49 to the lamp groups 12, 14 and the same switching vessels 23, 24. But no circuit can be closed from the main 15 to the main 16 through the lamp groups 11, 12, because one of the valves 46, 47 would prevent it according to the actual direction of the current. The function of the photo cells and grids remains the same as described with reference to Fig. 1, because it does not matter whether a current of correct direction starts within the switching vessels from one or more anodes.

Referring to Fig. 3, the curve 50 shows a train of current impulses of changing direction which flows through the lamp groups 11, 13, and curve 51 a train of current impulses of changing direction which flows through the lamp groups 12, 14. Apparently, while the positive half-wave 52 passes and illuminates the lamp groups 11, 13, due to the valve action of the switching vessels or of the valves, the simultaneously occurring negative half-wave 53 cannot pass the lamp groups 12, 14, which remain dark; this negative half-wave is therefore drawn in dotted lines, no current flows in its direction through the system. A negative half-wave 54 following the positive one 52 cannot pass, however, the lamp groups 11, 13, which now remain dark; this half-wave 54 is shown therefore in dotted lines. There is in phase with this negative half-wave 54 a positive half-wave 55 capable of passing and illuminating the lamp groups 12, 14, and shown therefore in full lines. For the lamp groups lying on half of the voltage created by the secondary 17, namely between one of the mains and the middle conductor, it is justified, for the sake of convenience, to speak of two trains of alternating current impulses which are opposite in phase and direction and simultaneously produced by the secondary 17 in order to supply the lamp groups, which are in this respect supplied independently from each other by the two currents. Obviously the current impulses of the two trains change their direction in a timed relationship, in particular simultaneously.

It results from the foregoing specification that two lamp groups forming a pair may be controlled by a single switching vessel and their number reduced thereby to one-half of the lamp groups used.

Obviously one lamp group will thus be illuminated while the other one remains dark, and vice versa. Supposing a frequency of 60 periods for the supplying alternating current, it appears that changes occur after $1/120$ second, which cannot be noticed by the human eye. Furthermore, the cathodes of the switching vessels have always to carry only the current of one lamp group although two lamp groups are controlled by each vessel having such cathode.

The switching vessels, the photo cells and the valves 46, 47, 48, 49 may be of any well-known type. If the valves are of a type needing a vacuum, their working parts may be arranged in the same vacuo as the filament of the lamps 11. Obviously, further simplification of this arrangement can be obtained in this way.

It is to be understood that the alternating current used for the purposes of the invention may either be a regular alternating current derived from proper machines, or a direct current which may be interrupted at a desired frequency, resulting in a periodic sequence of short flows of direct current, which are alternately supplied by means of suitable commutators in opposite direction to the mains 15, 16. Any suitable commutator driven in synchronism with the means for interrupting the direct current, or itself causing such interruption simultaneously, may be used for this purpose.

In Fig. 4 the mains 15, 16 and the center conductor 30 are connected with a source of direct current by means of a rotating switch consisting of conducting sections 56 separated by insulating sections 57. The conducting sections are connected with a conducting ring 58. The main 15 is connected with a brush 59 and the main 16 with a brush 60 gliding upon the circumferential surface of the rotating switch, while the brush 61 is connected with one of the terminals 62 which are to be connected with a source of direct current. The switch may be rotated in any suitable way, as, for instance, by a shaft 70 and a motor 71, preferably connected with the same source of direct current as is being connected to the terminals 62. If rotating the switch, for instance, with 15 turns per second, then the brush 59 will contact one of the conducting switches 56 four times during each revolution, while the other brush 60 will glide upon an insulating section 57, and vice versa, so that alternately 60 impulses of direct current will be sent during each second into the mains 15 and 16, respectively.

In Fig. 5 the lamp groups 11, 12 are combined in a screen 63, the conductors leading to them being combined in a cable 64, or in any other suitable way, leading to the screen 65, on one side of which the light responsive devices 32, 33, 34, 35 and on the other side of which the switching vessels 23, 24 are suitably arranged. It is to be understood that these switching vessels of the principal triode type as shown in Fig. 2 and used, but with two anodes, in Fig. 1, may be operated either in the particular way described hereinbefore with blocking voltage or they may be operated as normal triodes controlling by the grid the flow of current in such way that current may flow at a certain potential of the grid relative to the cathode, and as long as such potential is supplied, provided that a positive half-wave is applied to the co-ordinated anode. 66, 67 are conductors connecting the devices and vessels in the screen 65 and, thereby, the lamps in the screen 63 with a suitable source of alternating current. The moving parts of the projector 68 in which a film, stencil or the like with the pictures and communications to be displayed may be arranged, are driven by an alternating current motor 69 connected with the same source of alternating current as the devices, vessels and lamps of the screens 63, 65. Thereby synchronism of the transportation of the film with the alternating current supplied to the screens 63, 65 may be effected in a way similar to that more fully described in my co-pending patent application Serial No. 692,884.

What I claim is:

1. A system for displaying pictures and communications by means of a lamp field, the lamps of which are controlled by light responsive devices arranged to be illuminated in accordance with the desired display—said system comprising a plurality of lamp groups, each group consisting of at least one lamp; discharge vessels, each vessel comprising at least an anode and a cathode establishing a discharge gap between them and means controlling said discharge, said gap permitting the flow of current only in a certain direction and upon application of a certain voltage to its controlling means; means adapted to connect a source of current alternately changing its direction with series-arrangements each comprising a discharge vessel and a pair of said lamp groups and including unidirectional means for controlling the flow of current through each of said lamp groups; light responsive devices arranged in pairs, each pair of them being connected with the same electrodes to said controlling means to control the start of flow of current through said vessel while the other electrodes are adapted to be connected to a source of alternating voltage, said sources of current and voltage to be of the same frequency and substantially in phase and each of said pairs of lamp groups and light responsive devices connected to opposite poles of their respective sources.

2. A system for displaying pictures and communications by means of a lamp field, the lamps of which are controlled by light responsive devices arranged to be illuminated in accordance with the desired display—said system comprising a plurality of lamp groups, each group consisting of at least one lamp; discharge vessels, each vessel comprising an anode and a cathode establishing a discharge gap between them and means controlling said discharge, said gap permitting the flow of current only in a certain direction and upon application of a certain voltage to its controlling means, said discharge vessels and a pair each of said lamp groups being connected to form a series combination with the terminal of each of said lamp groups in parallel; three conductors, one being connected with the cathode of said vessels, the other ones each with one other terminal of said pairs of lamp groups; means for supplying electrical current of a certain direction alternately between the first mentioned and one of the other two said conductors; light responsive devices arranged in pairs; another three conductors, one connected with the cathode of said vessels, and the other ones each to an electrode of one of said devices of each pair, while the other electrodes of each of said pairs are connected to one of said controlling means to control the start of flow of current through said vessel; and means for supplying a voltage sufficient to cause or maintain the flow of current through the controlled vessel alternately between the first mentioned and one of the other two last mentioned conductors, the frequencies of alternations of said current and said voltage being identical and substantially in phase.

3. A system for displaying pictures and communications by means of a lamp field controlled by light responsive devices, arranged to be illuminated in accordance with the desired display; said system comprising a plurality of lamp groups, each group comprising at least one lamp; discharge vessels, each vessel having at least one anode and one cathode electrode and controlling means, said first two mentioned electrodes permitting the flow of current only in one direction through said vessel, such current starting upon application of a certain voltage to said controlling means; means for connecting at least two of said lamp groups each in series with the anode electrode of one of said vessels; means for feeding alternately and successively to each of said lamp groups and vessel connected in series therewith current impulses of a direction adapted to pass said vessel; means for applying alternately and successively voltages to the controlling electrodes of said vessel adapted to start said current flow substantially in synchronism with said current impulses; and light responsive devices included in said last mentioned means controlling the application of said voltages to said controlling means to control the start of flow of current through said vessel whereby a single discharge vessel is utilized to control at least two lamp groups.

4. A system for displaying pictures and communications by means of a lamp field controlled by light responsive devices, arranged to be illuminated in accordance with the desired display; said system comprising a plurality of lamp groups, each group comprising at least one lamp; discharge vessels, each vessel having at least one anode and one cathode electrode and a controlling electrode, said first two mentioned electrodes permitting the flow of current only in one direction through said vessel, such current starting upon application of a certain voltage to said controlling electrode; means for connecting at least two of said lamp groups each in series with the anode electrode of one of said vessels and including unidirectional means controlling the flow of current through each of said lamp groups; a source of alternating current having a neutral point; a source of alternating voltage having a neutral point and to be operated substantially in synchronism with said source of current, said voltage adapted to start said current flow; means for connecting the neutral point of said source of current with the cathode of said vessel and each terminal of said source with a lamp group connected in series with said vessel; means for connecting the neutral point of said source of voltage with the cathode of said vessels and the terminals of said source with the controlling electrodes of said vessels; and light responsive devices included in said connections of said latter terminals for controlling the application of said voltage to said controlling electrode to control the start of flow of current through said vessel whereby a single discharge vessel is utilized for controlling at least two lamp groups.

5. A system for displaying pictures and communications by means of a lamp field controlled by light responsive devices, arranged to be illuminated in accordance with the desired display; said system comprising a plurality of lamp groups, each group comprising at least one lamp; discharge vessels, each vessel having a cathode and a plurality of separate anode electrodes and a controlling electrode, said first mentioned electrodes permitting a flow of current only in one direction through said vessel, such current starting upon application of a certain voltage to said controlling electrode; means for connecting a lamp group each in series with one of said anodes; a source of alternating current having a neutral point; a source of alternating voltage having a neutral point and to be operated substantially in synchronism with said source of current, said voltage adapted to start said current flow; means for connecting the neutral point of said source of current with the cathode of said vessel and each terminal of said source with a lamp group each connected in series with said vessel; means for connecting the neutral point of said source of voltage with the cathode of said vessels and the terminals of said source with the controlling electrodes of said vessels, and light responsive devices included in said connections of said latter terminals for controlling the application of said voltage to said controlling electrode to control the start of flow of current through said vessel whereby a single discharge vessel is utilized for controlling at least two lamp groups.

6. A system for displaying pictures and communications by means of a lamp field controlled by light responsive devices, arranged to be illuminated in accordance with the desired display; said system comprising a plurality of lamp groups, each group comprising at least one lamp; discharge vessels, each vessel having an anode, a cathode and a controlling electrode permitting the start of flow of current through said vessels upon application of an alternating current having a neutral point; means for connecting the anode of each of said vessels with a number of said lamp groups corresponding to the number of phases of said source of current, and means for connecting a lamp group each thus co-ordinated to an anode with a terminal each of said source; means permitting the flow of current through a lamp group only towards said anode inserted in each of said series connections between a terminal and an anode; a series of alternating voltage having a neutral point and to be operated substantially in synchronism with said source of current, said voltage adapted to start the flow of said current; means for connecting the terminals of said source of voltage with the controlling means of said vessels; light responsive devices included in the connections of said terminals for controlling the application of said voltages to said controlling means to control the start of flow of current through said vessel; and means for connecting the neutral points of said sources of current and voltage with the cathode of said vessels whereby each discharge vessel is utilized for controlling at least two lamp groups.

7. In a system according to claim 4, a common supply of said sources of current and voltage.

8. In a system according to claim 5, a common supply of said sources of current and voltage.

9. In a system according to claim 4, a common supply of said sources of current and voltage and means provided for independently adjusting the current supplied to said lamp groups and the voltages applied to said controlling electrodes and light responsive devices, respectively.

10. In a system according to claim 5, a common supply of said sources of current and voltage and means provided for independently adjusting the current supplied to said lamp groups and the voltages applied to said controlling electrodes and light responsive devices, respectively.

KURT ROSENBERG.